United States Patent
Kim et al.

(10) Patent No.: US 9,680,629 B2
(45) Date of Patent: Jun. 13, 2017

(54) MAC CYCLE ALIGNMENT METHOD FOR NEIGHBORING NETWORK COORDINATION

(71) Applicant: Lantiq Deutschland GmbH, Neubiberg (DE)

(72) Inventors: Joon Bae Kim, Lexington, MA (US); Vladimir Oksman, Morganville, NJ (US)

(73) Assignee: Lantiq Deutschland GmbH, Neubiberg (DE)

( * ) Notice: Subject to any disclaimer, the term of this patent is extended or adjusted under 35 U.S.C. 154(b) by 212 days.

(21) Appl. No.: 13/913,504

(22) Filed: Jun. 9, 2013

(65) Prior Publication Data
US 2013/0272309 A1    Oct. 17, 2013

(51) Int. Cl.
| | | |
|---|---|---|
| H04L 12/28 | (2006.01) | |
| H04L 12/56 | (2006.01) | |
| H04L 7/00 | (2006.01) | |
| H04B 3/54 | (2006.01) | |
| H04L 12/40 | (2006.01) | |
| H04L 12/403 | (2006.01) | |

(52) U.S. Cl.
CPC ............... *H04L 7/00* (2013.01); *H04B 3/54* (2013.01); *H04L 12/40026* (2013.01); *H04L 12/4035* (2013.01); *H04B 2203/542* (2013.01); *H04B 2203/5408* (2013.01)

(58) Field of Classification Search
CPC  H04L 7/00; H04L 12/56; H04L 12/28; H04B 7/00; H04B 13/00; H04W 48/12
USPC .................................. 370/392, 328, 329, 350
See application file for complete search history.

(56) References Cited

U.S. PATENT DOCUMENTS

| | | | |
|---|---|---|---|
| 7,636,343 B2 | 12/2009 | Mizukoshi | |
| 7,856,008 B2* | 12/2010 | Ayyagari | H04B 3/542 370/350 |
| 8,301,760 B1* | 10/2012 | Zadicario | H04L 12/2803 709/224 |
| 8,676,982 B2* | 3/2014 | Lurie | H04L 5/0035 709/223 |
| 2009/0180465 A1* | 7/2009 | Closset | H04L 12/4035 370/350 |
| 2009/0238153 A1* | 9/2009 | Sim | H04W 84/20 370/336 |

(Continued)

FOREIGN PATENT DOCUMENTS

| | | |
|---|---|---|
| WO | 2006068621 A1 | 6/2006 |
| WO | 2010073168 A2 | 7/2010 |

OTHER PUBLICATIONS

Chinese Office Action issued on Jul. 28, 2015 for parallel Chinese Application No. 2011800671301.

(Continued)

*Primary Examiner* — Yemane Mesfin
*Assistant Examiner* — Abdelillah Elmejjarmi
(74) *Attorney, Agent, or Firm* — Eschweiler & Potashnik, LLC

(57) ABSTRACT

Representative implementations of devices and techniques provide communication between networked nodes while minimizing interference from neighbor network communication. Medium Access Control (MAC) cycles at the nodes may be aligned to MAC cycles of neighbor nodes and/or networks based on decoded timing information detected by the nodes.

19 Claims, 6 Drawing Sheets

(56) References Cited

U.S. PATENT DOCUMENTS

2010/0104030 A1    4/2010  Koga et al.
2010/0195603 A1    8/2010  Ho
2011/0255500 A1*  10/2011  Cavalcanti ............ H04W 16/14
                                                          370/329

OTHER PUBLICATIONS

English Translation of Chinese Office Action issued for parallel CN 2011800671301.
"Broadband Radio Access Networks (BRAN): HiperMAN; Data Link Control (DLC) layer," European Telecommunications Standards Institute, ETSI TS 102 178 V1.3.2 (Mar. 2006), Technical Specification, 96 pages.

* cited by examiner

MAC CYCLE ALIGNMENT METHOD FOR NEIGHBORING NETWORK COORDINATION

RELATED APPLICATIONS

This Application is a Continuation of International Application Number PCT/EP2011/006047, which was filed on Dec. 2, 2011. The International Application claimed priority to U.S. Provisional Application 61/421,583, which was filed on Dec. 9, 2010. The priority of the two identified prior filed applications is hereby claimed. The entire contents of the two identified prior filed applications are hereby incorporated herein by reference.

BACKGROUND

When more than one network operates on a shared medium in the same frequency band, there is a chance that the networks will interfere with each other. Several or many networks may use a shared medium concurrently, mutually interfering with each other. In a power line communication system, for example, this is a common problem known as neighbor network interference.

Common coexistence specifications may be provided to help avoid network interference on shared medium systems. Coexistence specifications (e.g., IEEE 1901 and ITU-T G.hn., for power line communication (PLC)) often suggest the use of signaling to prevent interference. However, signaling may require some of the bandwidth of the shared medium to function, and may reduce the bandwidth available to the networks for communication.

Other coexistence specifications such as Inter System Protocol (ISP) defined in ITU-T G.9972 and IEEE 1901 offer resource sharing techniques. However, many of the schemes are designed to align heterogeneous networks that use different technologies. Such schemes are not generally equipped to administer multiple homogeneous networks, for example. Further, many of these schemes also require additional bandwidth for special signaling and have difficulties with inconsistencies in the operation of the different networks.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Representative implementations of devices and techniques provide communication between networked nodes operating on a shared communication network medium, while minimizing interference from neighbor network communication. Networked nodes are arranged to align medium access control (MAC) cycles with those of neighbor network nodes to synchronize the timing of network communication to minimize, if not eliminate, neighbor network interference. In an implementation, the nodes are arranged to align their MAC cycles based on information (e.g., timing information) detected by one or more of the nodes from a neighboring node or network. In another implementation, the nodes are arranged to align their MAC cycles based on a MAC cycle identification (ID) value at one or more of the nodes and/or a quantity of domains that are synchronized with the MAC cycle represented by the MAC cycle ID value.

Various implementations for minimizing interference from neighbor networks, including techniques and devices, are discussed with reference to the figures. The techniques and devices discussed may be applied to any of various network designs, circuits, and devices and remain within the scope of the disclosure.

Implementations are explained in more detail below using a plurality of examples. Although various implementations and examples are discussed here and below, further implementations and examples may be possible by combining the features and elements of individual implementations and examples.

Example Communication System

Figure 1:
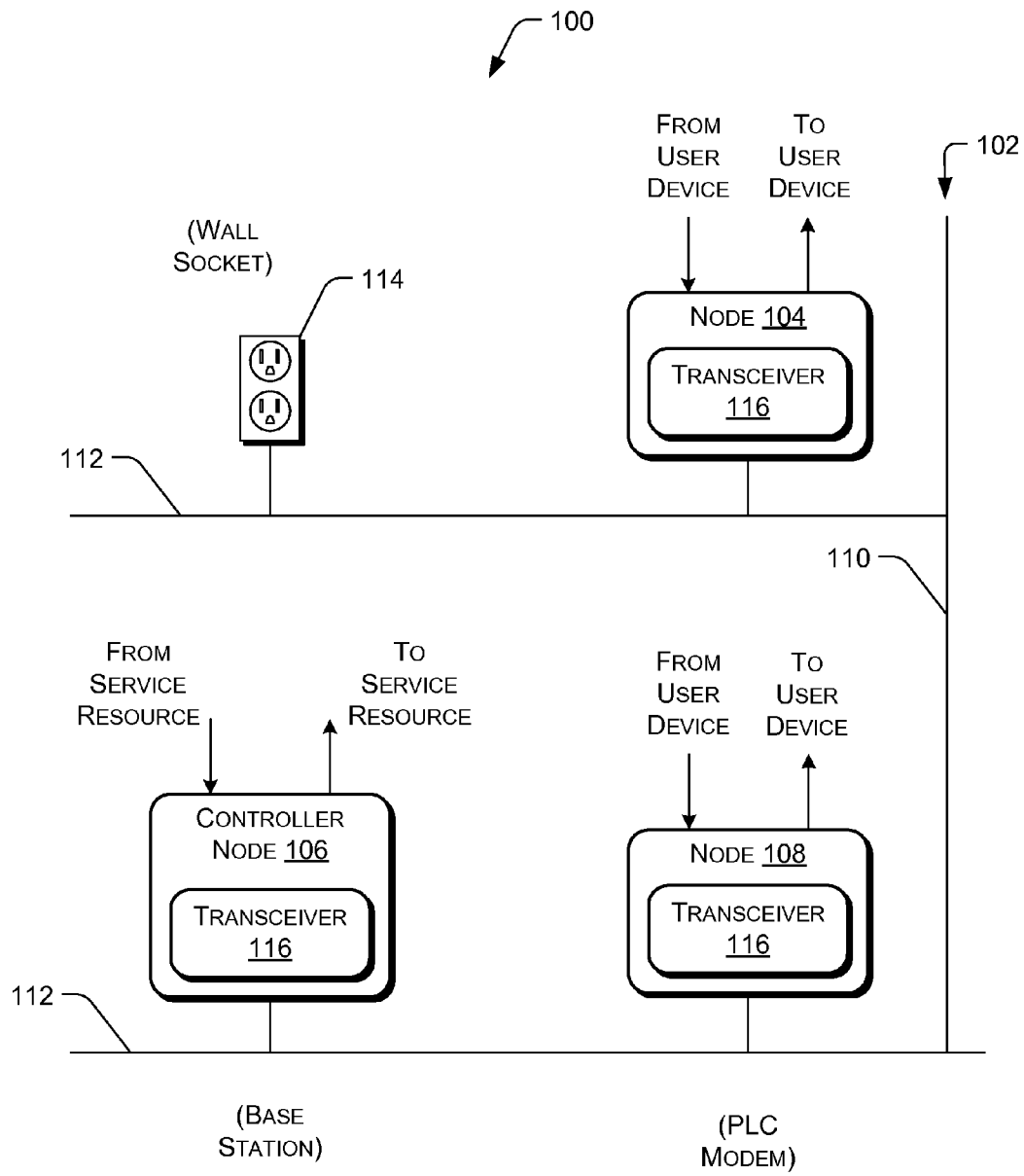
FIG. 1 is schematic of an example network or system in which the techniques in accordance with the present disclosure may be implemented.

In one implementation, as shown in FIG. 1, a system 100 comprises a communication network medium 102 shared by at least two nodes (e.g., nodes 104, 106, and 108) coupled to the medium 102. The nodes 104-108 are arranged to communicate at least in part via the medium 102. In one implementation, the system 100 is a multicarrier arrangement or system. In various alternate implementations, the system 100 based on the communication network medium 102 comprises a single communication channel and the nodes 104-108 represent discrete homogeneous networks communicatively coupled to the single communication channel.

The medium 102 may be comprised of a trunk or feeder 110 and one or more branches 112. In one example, the system 100 is a power line communication (PLC) system. In that case, the trunk 110 and branches 112 are electrical power distribution conductors (e.g., power lines) arranged to distribute electric power to one or more end user locations (e.g., within residences, commercial or professional suites, industrial sites, etc.). In the example, nodes 104-108 are coupled to the electric power lines and arranged to communicate at least in part via the electrical power lines. While the disclosure, including the figures and the discussion herein, discuss the techniques and devices disclosed in terms of a PLC system, the techniques and devices may be used for minimizing or eliminating neighbor network interference on other types of networks (e.g., wired and/or wireless, optical, etc.) without departing from the scope of the disclosure. For example, the medium 102 may be realized as a wireless communication medium, a wire line communication medium (e.g., coaxial cable, twisted pair of copper wires, power line wiring, optical fiber, etc.), or as combinations thereof.

As shown in FIG. 1, nodes 104-108 may be coupled to the medium 102 via one or more power outlets 114. For example, a node (104-108) may be "plugged in" to a wall socket (power outlet 114). Alternately, nodes 104-108 may be hardwired to the medium 102, or may be coupled in another manner allowing communication via the medium 102 (e.g., inductive coupling, optical coupling, wireless coupling, etc.).

As shown in FIG. 1, nodes 104-108 may also have connection to and/or from user devices, service resources, and the like. For example, a node (104-108) may be communicatively coupled to a user communications device, an automation console, a surveillance hub, a power usage monitoring and/or control interface, a service provider feed, a utility connection, and so forth. In one implementation, one or more of the nodes 104-108 is a controller node 106 (e.g., base station, master node, etc.) arranged to control communication of information with regard to the network. For example, a controller node 106 may receive an entertainment feed from a service provider, and distribute content to other nodes on the network (such as nodes 104 and 108) as well as optionally provide for content consumption at the controller node 106 itself. In one case, the controller node 106 may control the type of content that is distributed to the other nodes 104 and 108, control the bandwidth used by the other nodes 104 and 108, and/or provide other control functions.

In one implementation, one or more of the nodes 104-108 may include a multicarrier apparatus, transmitter, receiver, transceiver, modem, or the like, (generically referred to herein as a "transceiver 116") for communication via the network. Accordingly, the nodes 104-108 may include structure and functionality that enable signal communication over the medium 102. Such structure and functionality may include one or more antennas, integrated wire line interfaces, and the like. Depending on the implementation, the nodes 104-108 may communicate with one another directly (peer-to-peer mode) or the nodes 104-108 may communicate via the controller node 106. In one implementation, the nodes 104-108 are Orthogonal Frequency Division Multiplexing (OFDM) apparatuses capable of implementing the herein described implementations. For example, the nodes 104-108 may include a transceiver and/or a controller, as is discussed below.

In one implementation, system 100 may be a home network and one or more of the nodes 104-108 may be an access point of the home network. For example, in the implementation the controller node 106 may be a residential gateway that distributes broadband services to the other nodes (e.g., nodes 104 and 108). The nodes 104-108 may be associated with digital content destinations in the home, but may also be associated with digital content sources, such as digital video recorders (DVR), computers providing streaming video, televisions, entertainment centers, and the like.

Furthermore, the nodes 104-108 may be enabled to communicate using packet-based technology (e.g., ITU G.hn, HomePNA, HomePlug® AV and Multimedia over Coax Alliance (MoCA)) and xDSL technology). Such xDSL technology may include Asymmetric Digital Subscriber Line (ADSL), ADSL2, ADSL2+, Very high speed DSL (VDSL), VDSL2, G.Lite, and High bit rate Digital Subscriber Line (HDSL). In addition, the nodes 104-108 may be enabled to communicate using IEEE 802.11 and IEEE 802.16 (Wi-MAX) wireless technologies.

Figure 2:
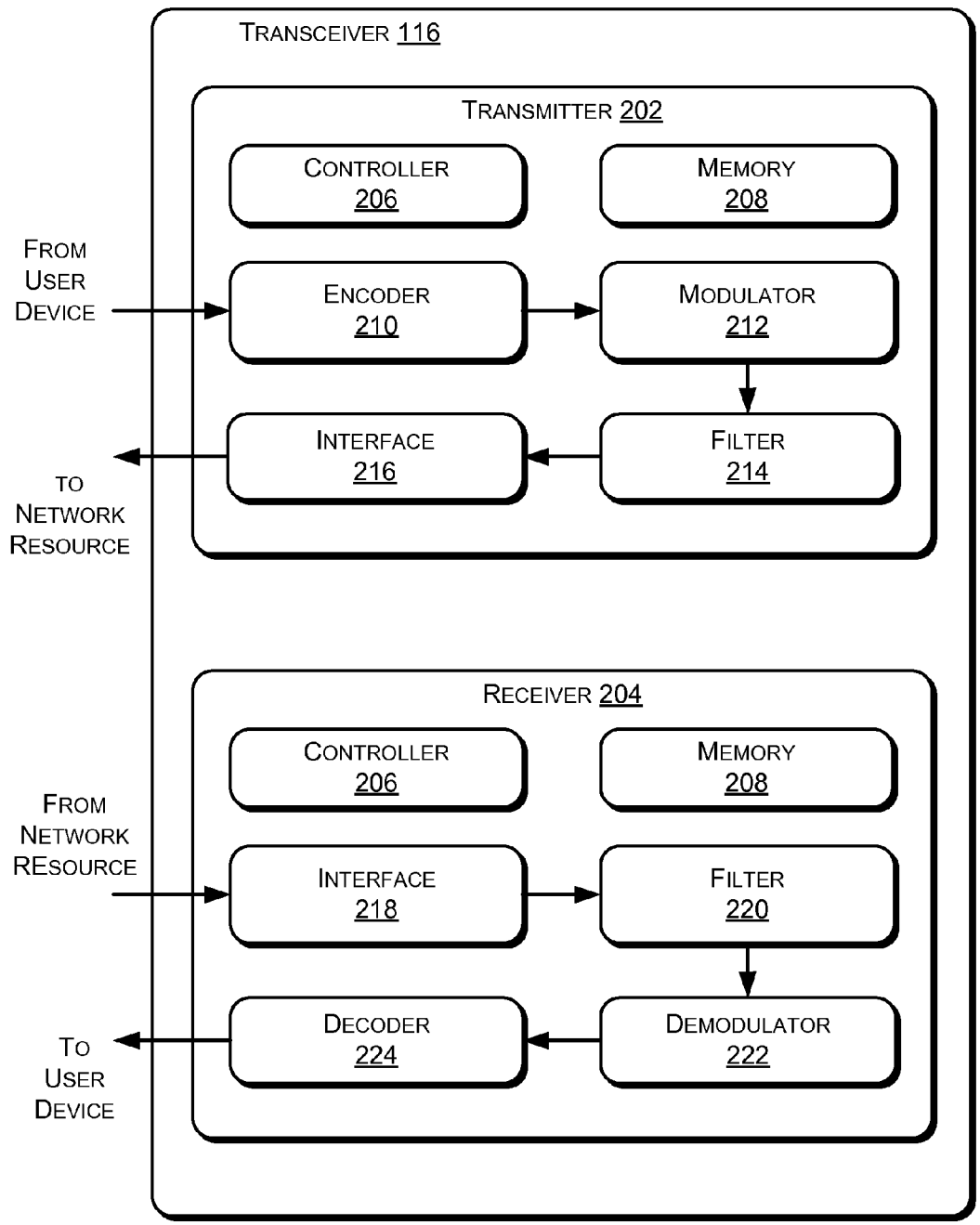
FIG. 2 is a block diagram illustrating one example of a node implemented as part of the network of FIG. 1.

In the example of FIG. 1, each of the nodes is shown having a transceiver 116. An example transceiver 116 is illustrated in FIG. 2. The transceiver 116 may include a transmitter portion 202 and/or a receiver portion 204, where one or both of the portions may include a controller 206 and/or memory 208. In various implementations, a single controller 206 may be shared by the transmitter 202 and the receiver 204. Likewise, in some implementations, a single memory 208 may be shared by the transmitter 202 and the receiver 204, or alternately the memory 208 may be comprised of multiple memory devices distributed in one or more of the transceiver 116, the transmitter 202, and the receiver 204.

As used herein, the term "controller 206" is meant generally to include all types of digital processing devices including, without limitation, digital signal processors (DSPs), reduced instruction set computers (RISC), general-purpose (CISC) processors, microprocessors, gate arrays (e.g., FPGAs), programmable logic devices (PLDs), reconfigurable compute fabrics (RCFs), array processors, secure microprocessors, and application-specific integrated circuits (ASICs). Such digital processors may be contained on a single unitary IC die, or distributed across multiple components. If included, the controller 206 may direct the flow of information through the transceiver 116, may provide timing to the components of the transceiver 116, may determine MAC cycle synchronization or alignment as discussed below, and the like.

If included, the memory 208 may store executable instructions, software, firmware, operating systems, applications, preselected values and constants, and the like, to be executed or used by the controller 206, for example. In various implementations, the memory 208 may include computer-readable media. Computer-readable media may include, for example, computer storage media. Computer storage media, such as memory 208, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device (such as the controller 206). Although the computer storage media (memory 208) is shown within the transceiver 116 it will be appreciated that the memory 208 may be distributed or located remotely and accessed via a network or other communication link.

As shown in FIG. 2, an example transmitter 202 may include an encoder 210, a modulator 212, a filter 216, and an interface 214. In alternate implementations, a transmitter 202 may include fewer components, alternate components, or additional components and remain within the scope of the disclosure.

In an implementation, signals exchanged between the nodes 104-108 may include multicarrier symbols that each includes a plurality of tones or sub-channels. Each of the tones within a multicarrier symbol may have data bits modulated thereon that are intended for delivery from one of the nodes 104-108 to another. In an implementation, the transmitter 202 is arranged to modulate the data bits onto the tones and transmit the signals including the tones via the medium 102.

If included, the encoder 210 is arranged to receive data (e.g., from a user device) for communication to a receiving device coupled to the transceiver 116 via a wireless or wire line medium 102. More specifically, the encoder 210 is arranged to translate incoming data bit streams into in-phase and quadrature components for the plurality of tones. The encoder 210 may be arranged to output a number of symbol sequences that are equal to the number of tones available to the system 100.

If included, the modulator 212 is arranged to receive symbol sequences (e.g., from the encoder 210) to produce a modulated signal in the form of a discrete multi-tone signal. The modulator may pass the modulated signal to the filter 214 (if the filter is included) to undergo various filtering. In one implementation, the filtered signal is passed to the interface 216 for communication over the medium 102 to a receiving device. For example, the interface 216 may facilitate communication of the modulated signal to a network resource such as an automation control center, a surveillance hub, and the like.

In various implementations, the transceiver 116 may also include a receiver 204 that is capable of receiving modulated multi-tone signals communicated over the medium 102 from a transmitting device. As shown in FIG. 2, an example receiver 204 may include an interface 218, a filter 220, a demodulator 222, and a decoder 224. In alternate implementations, a receiver 204 may include fewer components, alternate components, or additional components and remain within the scope of the disclosure.

In one implementation, signals received by the receiver 204 may be passed to the filter 220 via the interface 218. The interface 218 may facilitate communication with a network resource, for example. After received signals undergo filtering by way of the filter 220 (if included), the filtered signals may be demodulated by the demodulator 222. The demodulated signals may be passed to and processed by the decoder 224.

If included, the decoder 224 produces data bit streams for consumption by a computing device, or the like. Effectively, the demodulator 222 and the decoder 224 perform the opposite functions of the modulator 212 and the encoder 210, respectively.

In various implementations, one or more of the controller 206, encoder 210, decoder 224, modulator 212, demodulator 222, interface 216 and/or 218, filter 214 and/or 220, as well other components, may be implemented in hardware, firmware, software, or the like, or in combinations thereof.

Exemplary implementations discussed herein may have various components collocated; however, it is to be appreciated that the various components of the system 100 may be located at distant portions of a distributed network, such as a communications network and/or the Internet, or within a dedicated secure, unsecured and/or encrypted arrangement. Thus, it should be appreciated that the components of the system 100 may be combined into one or more apparatuses, such as a modem, or collocated on a particular node of a distributed network, such as a telecommunications network. Moreover, it should be understood that the components of the described system 100 may be arranged at any location within a distributed network without affecting the operation of the system 100. For example, the various components can be located in a Central Office modem (CO, ATU-C, VTU-O), a Customer Premises modem (CPE, ATU-R, VTU-R), an xDSL management device, or some combination thereof. Similarly, one or more functional portions of the system 100 may be distributed between a modem and an associated computing device.

Example Alignment Operations

In order to coordinate two or more networks using the same technology (e.g., ITU-T G.9960/G.9961, IEEE 1901 FFT, IEEE 1901 Wavelet, etc.) on a shared communication medium (such as medium 102, for example), it can be convenient to align the networks so that a common communication channel/time slot can be placed in a same relative location in two independently operating networks (e.g., the common time slot is put in a predefined location within a fixed medium access control (MAC) cycle). With reference to a PLC system, for example, the alternating current waveform present in the medium 102 may be used as a reference for determining the predefined location. In other words, the predefined location may be a predefined point or portion of the AC cycle.

The existing MAC cycle (e.g., "MAC cycle" defined in ITU-T G.9960/G.9961 or "beacon period" defined in IEEE 1901, etc.) may be used with a mechanism to allocate a predefined location around an AC waveform zero-crossing, for example, for each technology group. By exchanging signals at this predefined location, multiple systems can be aligned with respect to the shared medium 102.

Figure 3:
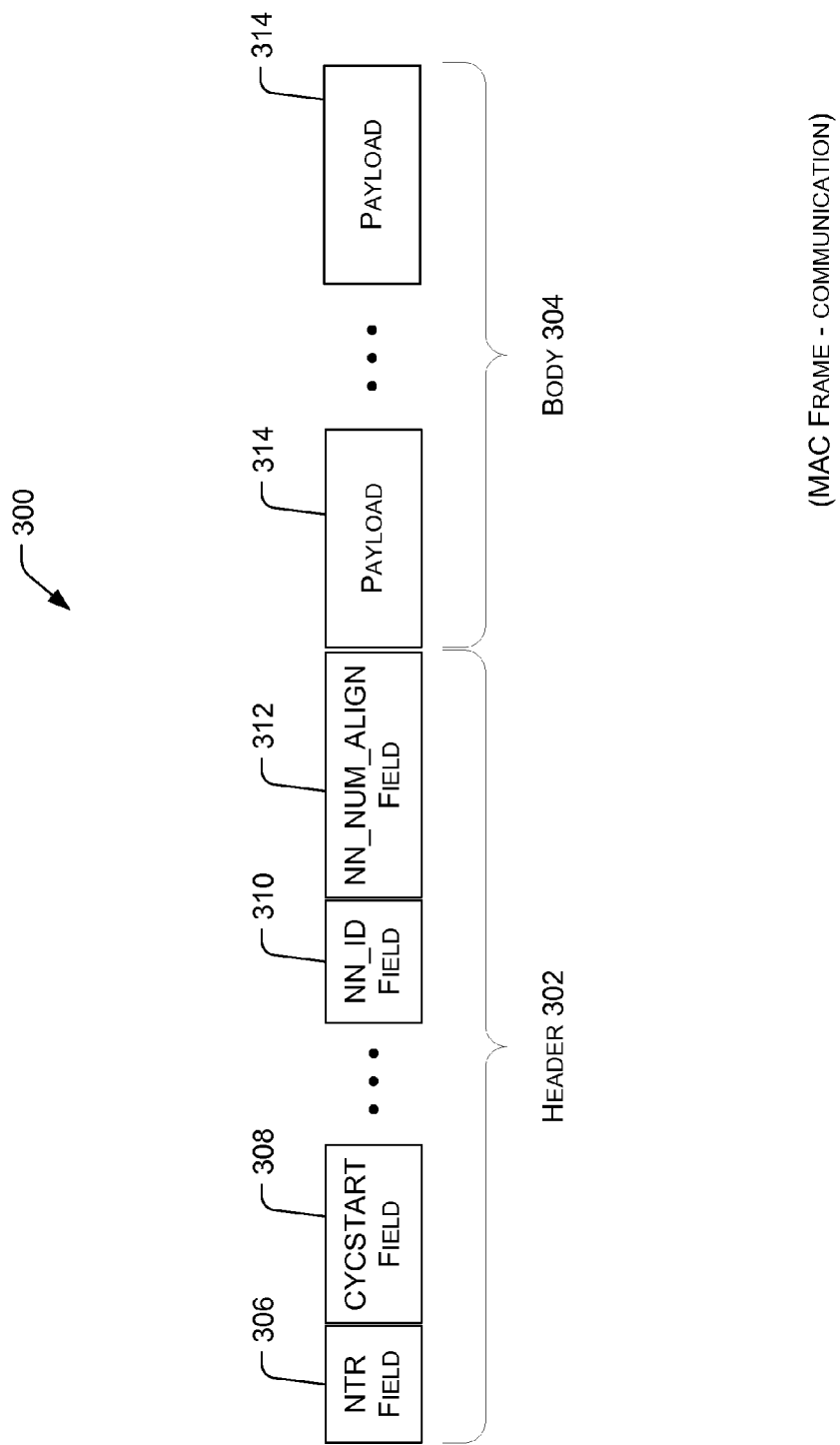
FIG. 3 is a schematic of an example communication block, according to an implementation.

FIG. 3 is a schematic of an example communication 300, according to an implementation. In the implementation, a node 104-108 or a neighbor node or network may periodically transmit a communication 300 as part of its operation, to inform other nodes or networks, among other things, of the node's timing information and/or synchronization. For example, a controller 206 at a node 104-108 may execute instructions stored in a memory 208 at the node 104-108 to generate and/or transmit the communication 300 via the medium 102. In one implementation, the communication 300 is a mobile applications protocol (MAP) physical layer (PHY) frame communication.

In one implementation, as shown in FIG. 3, the communication 300 includes a header portion 302 and a body portion 304. In an implementation, the header 302 comprises timing information for the node 104-108 or network and the body portion 304 may comprise some type of payload 314. The timing information in the header 302 includes a network timing reference (NTR) 306 field and a cycle start (CYC-START) 308 field to point to the start of the MAC cycle at the node 104-108 or network. Additionally or alternatively, at least two other fields may be included in the header of the communication 300: a MAC cycle ID field 310 (NN_ID field 310, in the example of FIG. 3) to indicate a specific MAC cycle alignment identification and a quantity field 312 (NN_NUM_ALIGN field 312, in the example of FIG. 3) to indicate a number of domains that are synchronized with an identified MAC cycle. In one implementation, the quantity field 312 of a communication 300 indicates the quantity of domains that are synchronized with the MAC cycle represented by the MAC cycle ID field 310 of the communication 300. These fields are discussed in more detail below.

By decoding the communication 300 (e.g., a MAP PHY frame) from a neighbor network, a node 104-108 can determine the start of the MAC cycle of the neighbor network and compute an offset with respect to its own MAC cycle. Using this information, a node 104-108 or network can align its MAC cycle to a neighbor's network. In some implementations, with this technique, no additional communication channel, special signaling, or centralized control are used. In an implementation, a node 104-108 is arranged to align its MAC cycle to another MAC cycle at another node based on a comparison of the communication 300 with a like communication from the other node. The timing information included in the communication 300 is discussed further with reference to the diagram of FIG. 4.

Figure 4:
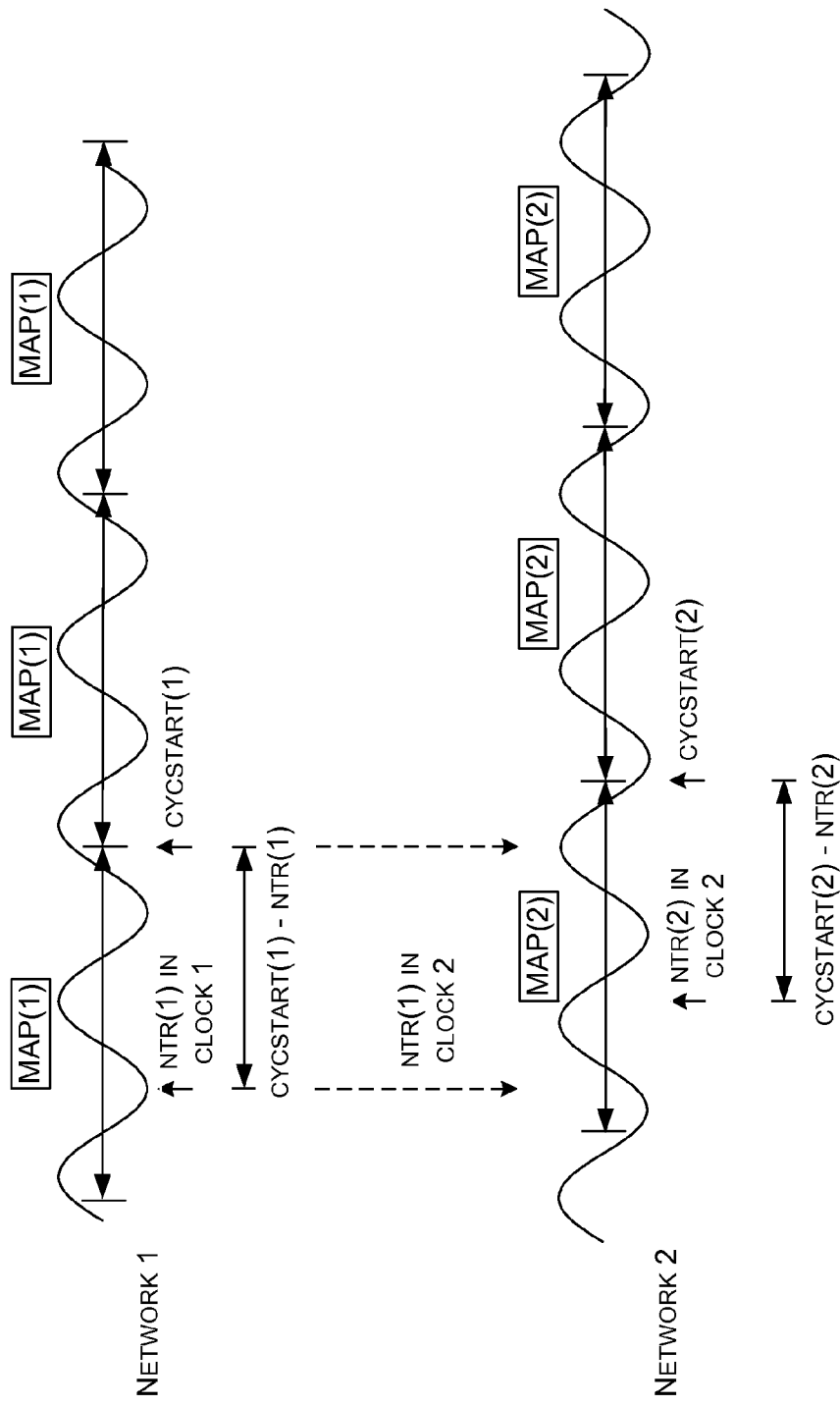
FIG. 4 is an illustration of an example timing diagram showing techniques for aligning MAC cycles of two example networks.

FIG. 4 is an illustration of an example timing diagram showing techniques for aligning MAC cycles of two example networks. The illustration of FIG. 4 shows timing locations with reference to an AC waveform, for a "network 1" and a "network 2." In an example implementation, network 1 and network 2 are similar networks using like technologies that share a common communication medium 102. A mobile applications protocol (MAP) is shown for each of network 1 and network 2 (i.e., MAP(1) and MAP(2)), along with a cycle span indicated by arrows, showing the communication cycle or MAC cycle for each of the networks with respect to the AC waveform. Each of network 1 and network 2 are shown having a network timing reference (e.g., NTR (1) and NTR (2)) and a cycle start location (e.g., CYCSTART (1) and CYCSTART (2)) with respect to the AC waveform. Further, as shown in the illustration, the differences between the network timing reference and the cycle start location for reach network can be measured. As shown, the difference varies depending on the location of each of these reference points on the AC waveform. This variation, and/or the relative locations of the NTR and CYCSTART references may be used to determine a misalignment of network 1 and network 2.

In one implementation, a node 104-108 may use a MAP PHY frame (such as the communication 300 shown in FIG. 3) transmitted by a node in its own network along with a MAP PHY frame transmitted by another node belonging to different (neighboring) network to estimate a MAC cycle misalignment. Further, a reconciliation mechanism may be specified between neighbor networks during a MAC cycle alignment process that determines which MAC cycle a network is to be aligned to. In other words, referring to FIG. 4, the reconciliation mechanism may determine that network 1 is to align its MAC cycle to network 2 or that network 2 is to align its MAC cycle to network 1, depending on the rules of the reconciliation mechanism. In one implementation, the reconciliation mechanism employed is based in part on at least one of a MAC cycle start time, a network alignment, and a MAC address value. In an alternate implementation, the reconciliation mechanism comprises employing a random MAC cycle start time for a network of a node 104-108. For example, a random start time may be useful for fault recovery or similar situations.

In another implementation, the reconciliation mechanism employed uses a set of rules having an order of priority to determine alignment of neighbor networks. That is, between networks, the network or node having a higher priority is synchronized to (i.e., aligned to) by the other network(s). In one example, the highest priority is given to the network that is already synchronized to an access network. An access network may include a part of a network that directly connects subscribers to a service provider.

In another example, a higher priority is given to a network that has a greater number of aligned networks. For instance, a higher priority would be given to a network having five networks already synchronized to it than to a network that has fewer or no networks synchronized to it. In a further example, a higher priority is given to a network whose master node has a bigger MAC address. This example may be used, for instance, as a tie breaker (e.g., in a case where other rules do not indicate a particular network has priority).

In various implementations, the reconciliation mechanism may be generated or executed by the controller 206 and/or stored in the memory 208. In alternate implementations, the reconciliation mechanism may be generated and/or stored in other local locations or in one or more remote locations.

In alternate implementations, one or more of the above techniques may be employed concurrently, or another technique may be used to accomplish the same or similar results. The implementations herein are described in terms of exemplary embodiments. However, it should be appreciated that individual aspects of the implantations may be separately claimed and one or more of the features of the various embodiments may be combined.

Representative Processes

Figure 5:
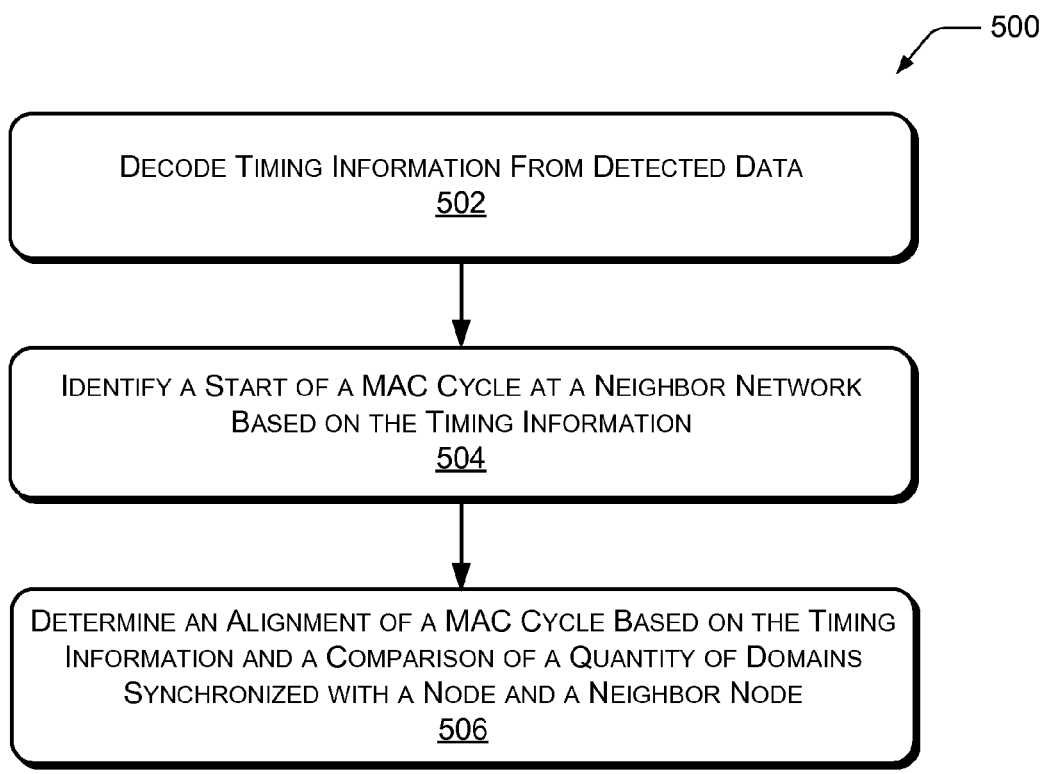
FIG. 5 is a flow diagram illustrating an example process of aligning a node with a neighbor node, according to an implementation.

FIG. 5 illustrates a representative process 500 for aligning a MAC cycle at a node (such nodes 104-108) with a MAC cycle at a neighbor node. The described techniques may also be used with domains, networks, and the like. An example process 500 may be performed on a system 100, for example, where a common network communication medium 102 is shared. In one example, the communication network medium 102 comprises a single communication channel and at least two nodes (such as one or more of the nodes 104-108) representing discrete homogeneous networks are communicatively coupled to the single communication channel. The process 500 is described with reference to FIGS. 1-4.

At block 502, the process includes decoding, at a node (such as nodes 104-108), timing information from data detected at a neighbor network. For example, the data may be a part of a communication such as communication 300. In one implementation, the data comprises a mobile application protocol (MAP) physical layer (PHY) frame.

At block 504, the process includes identifying a start of a medium access control (MAC) cycle at the neighbor network based on the timing information. For example, the node may identify the start of the neighboring MAC cycle based on a network timing reference (NTR) field 306 and/or a cycle start (CYCSTART) field 308 included in the MAP PHY frame.

At block 506, the process includes determining an alignment for a MAC cycle at the node with respect to the MAC cycle at the neighbor network based at least in part on the timing information and a comparison of a quantity of domains that are synchronized to the MAC cycle at the node and another quantity of domains that are synchronized to the MAC cycle at the neighbor node. Accordingly, the MAP PHY frame may include a quantity field (such as NN_NUM_ALIGN field 312) indicating a quantity of domains synchronized to a MAC cycle.

In another implementation, the process includes comparing a MAC cycle identification value at the node with a MAC cycle identification value at the neighbor node and determining the alignment for the MAC cycle at the node based at least in part on the comparison. Thus, the MAP PHY frame may also include a MAC cycle ID field (such as NN_ID field 310).

In another implementation, the process includes employing a reconciliation mechanism for determining the alignment for the MAC cycle at the node with respect to the MAC cycle at the neighbor network. In one example, the reconciliation mechanism is based in part on at least one of a MAC cycle start time, a network alignment, and a MAC address value. For instance, in an implementation, the reconciliation mechanism comprises employing a random MAC cycle start time at a network of the node.

In another implementation, the reconciliation mechanism uses a set of prioritized rules to determine which node(s) or network(s) are to align with another node or network. As between a plurality of nodes or networks, a node or network having priority is aligned to (or synchronized to) by the other node(s) or network(s). In one example, the reconciliation mechanism comprises giving priority to a network that is synchronized to an access network. In another example, the reconciliation mechanism comprises giving priority to a network that has a greater number of networks aligned to it.

In a further example, the reconciliation mechanism comprises giving priority to a network having a master node with a larger MAC address.

Figure 6:
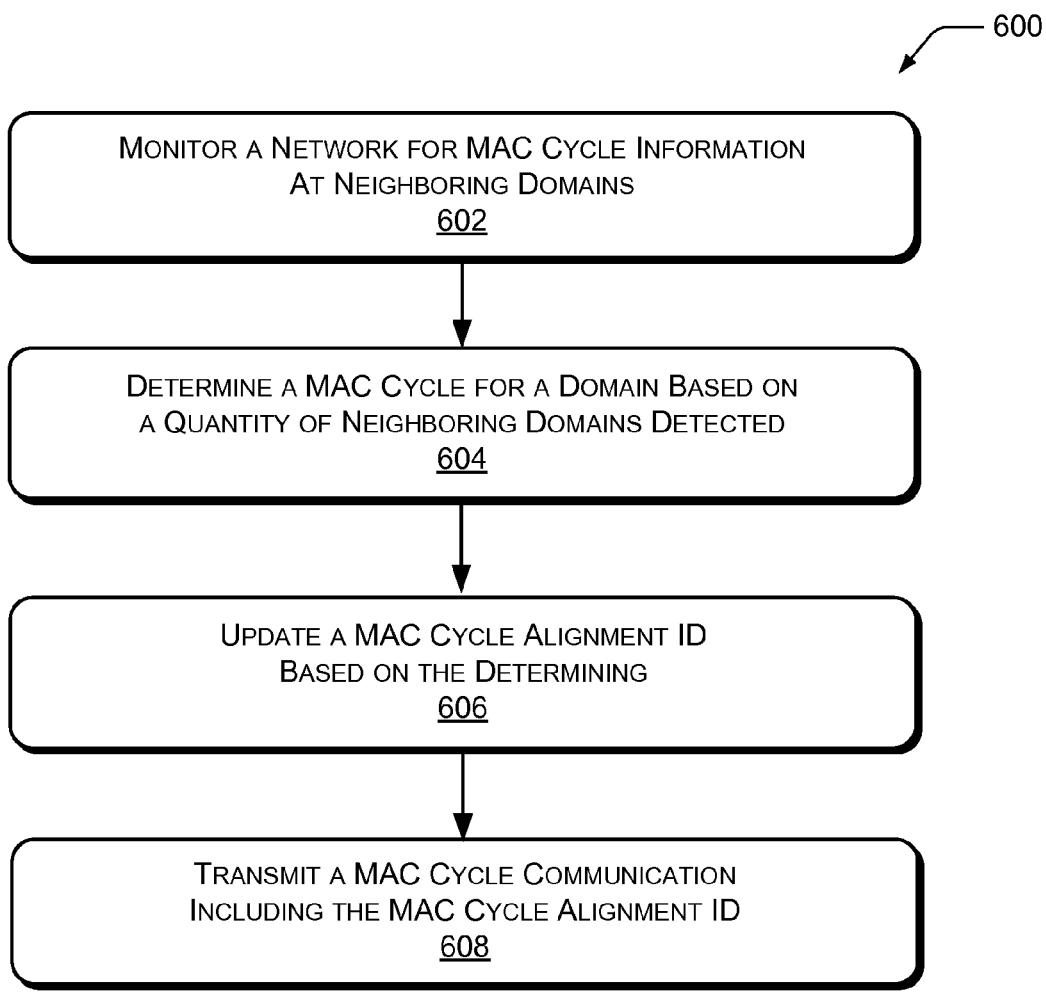
FIG. 6 is a flow diagram illustrating an example process of aligning MAC cycles of neighboring networks, according to an implementation.

FIG. 6 illustrates a representative process 600 for aligning MAC cycles of neighboring nodes and/or networks based on decoding a MAP PHY frame transmitted by multiple domain masters belonging to different domains. An example process 600 may be performed with respect to a system 100, for example, where a common network communication medium 102 is shared. In one example, the communication network medium 102 comprises a single communication channel and at least two nodes (such as one or more of the nodes 104-108) representing discrete homogeneous networks are communicatively coupled to the single communication channel. The process 600 is described with reference to FIGS. 1-4.

The representative process 600 can be divided into two categories: initial synchronization, when a node 104-108 (such as a domain master, for example) determines its MAC cycle for the first time; and resynchronization when the node 104-108 detects the presence of neighboring domains and may adjust its MAC cycle to align with its neighbors' MAC cycles. In various situations, as described below, the node may adjust its MAC cycle to the MAC cycle of the neighbor domain or maintain its MAC cycle and allow the neighbor domain to align its MAC cycle to that of the node.

The representative process makes use of the addition of the MAC cycle ID field (such as NN_ID field 310) and/or the quantity field (such as NN_NUM_ALIGN field 312) as additional fields to a MAP PHY frame (such as communication 300, for example). As discussed above, the MAC cycle ID field (or MAC cycle alignment ID) indicates a specific MAC cycle alignment identification. Thus, domains having the same MAC cycle ID have synchronized MAC cycles. Also as discussed above, the quantity field indicates the number of domains that are synchronized to the MAC cycle referred to by the MAC cycle ID.

At block 602, the process includes monitoring, by a node (a domain master, for example), a network for medium access control (MAC) cycle information at neighboring domains. In an implementation, the node searches for at least X1 seconds, where X1 is selected randomly from between two preselected limits. The preselected limits may be determined based on the economy of the system (i.e., best use of resources).

In an implementation, when an access system is present and Inter System Protocol (ISP) (e.g., G.9972) is activated at the network, the node synchronizes its MAC cycle with that of the access system. In this case, the MAC cycle ID at the node is updated to indicate that the MAC cycle at the node is synchronized with an access system via the ISP. In one implementation, the node does not resynchronize its MAC cycle after synchronizing to an access system, but maintains alignment with the access system.

In an implementation, the node may continue to monitor the network after synchronizing with the access system or with another domain. After initial synchronization, if the node detects an unsynchronized neighboring domain (i.e., the start of MAC cycle of the neighboring domain is misaligned by a preselected duration), the node continues to monitor neighboring MAP PHY frames at least for another Y1 seconds after the initial detection, where Y1 is selected randomly between two other preselected limits. In an implementation, the other preselected limits are determined based on the economy of the system (i.e., best use of resources).

At block 604, the process includes determining, by the node, a MAC cycle for a domain at the node based on a quantity of neighboring domains detected. In alternate implementations, the process at block 604 may include initial synchronization or resynchronization of a node.

In an implementation, if the node is not aligned with another node or an access cycle, and the node is unable to detect any MAP PHY frames from other domains, the node selects a start for its MAC cycle based on one or more alternating current (AC) line cycle synchronization rules. For example, the node may determine a start for its MAC cycle based on a feature of an AC power waveform present on the network communication medium (e.g., a peak, a trough, a zero-crossing region, etc.).

In another implementation, if the node detects only one neighboring domain, and the node is not already synchronized to a domain, the node aligns its MAC cycle with the detected domain. In one example, the node identifies the start of the MAC cycle of the detected domain by decoding the NTR and CYCSTART fields carried in the MAP PHY frame header at the detected neighbor domain. Alternately, if the node has already synchronized to a domain, the node decodes the MAP PHY frame of the detected neighboring domain. If the MAP PHY frame of the detected neighboring domain has a smaller quantity field value than that of the node and a MAC cycle ID indicating that the neighboring domain is not aligned to an access system, the node does nothing. Otherwise, the node resynchronizes its MAC cycle to the MAC cycle of the detected neighboring domain.

In a further implementation, if the node detects more than one neighboring domain, and the node is not already synchronized to a domain, the node aligns its MAC cycle with a MAC cycle of another domain according to the following descending priority:

i) aligning the MAC cycle for the domain at the node to a MAC cycle of a domain that is aligned to an access network; or ii) aligning the MAC cycle for the domain at the node to a MAC cycle of a domain that has a larger quantity of other domains aligned to its MAC cycle; or iii) aligning the MAC cycle for the domain at the node to a MAC cycle of a domain that has a larger MAC cycle ID value and is not aligned to an access network.

At block 606, the process includes updating the MAC cycle ID at the node's domain based on the determined MAC cycle alignment. For example, if the node aligns its MAC cycle with that of a neighbor domain, the node updates the node's MAC cycle ID to that of the neighbor domain.

At block 608, the process includes transmitting a MAC cycle communication (such as communication 300) including the MAC cycle alignment ID.

In an implementation, the process further comprises updating a value indicating a number of domains that are synchronized to the MAC cycle for the node's domain (e.g., quantity field) and transmitting the MAC cycle communication including the quantity value.

In the situation where the node detects only one neighbor domain, and the node aligns its MAC cycle with the detected domain, the process includes updating the MAC cycle alignment ID of the node to the MAC cycle alignment ID of the neighboring domain, updating the quantity field value indicating the number of domains that are synchronized to the neighboring domain's MAC cycle to 2, and transmitting an updated MAC cycle communication including the updated MAC cycle alignment ID and the updated quantity field value.

In the situation where the node detects more than one neighboring domain, and aligns its MAC cycle with one of the neighboring domains, the process includes updating the MAC cycle alignment ID of the node to the MAC cycle alignment ID of the other domain, updating a quantity field value at the node to one more than the number of domains that were previously synchronized to the MAC cycle for the other domain, and transmitting an updated MAC cycle communication including the updated MAC cycle alignment ID and the updated value.

The order in which the processes 500 and 600 are described is not intended to be construed as a limitation, and any number of the described process blocks can be combined in any order to implement the processes, or alternate processes. Additionally, individual blocks may be deleted from the processes without departing from the spirit and scope of the subject matter described herein. Furthermore, the processes can be implemented in any suitable hardware, software, firmware, or a combination thereof, without departing from the scope of the subject matter described herein.

In alternate implementations, other techniques may be included in the processes 500 and 600 in various combinations, and remain within the scope of the disclosure.

The above-described arrangements, apparatuses and methods may be implemented in a software module, a software and/or hardware testing module, a telecommunications test device, a DSL modem, an ADSL modem, an xDSL modem, a VDSL modem, a linecard, a G.hn transceiver, a MOCA transceiver, a Homeplug transceiver, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, MOCA, G.hn, Homeplug or the like.

Additionally, the arrangements, procedures and protocols of the described implementations may be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable device, or the like. In general, any apparatus capable of implementing a state machine that is in turn capable of implementing the methodology described and illustrated herein may be used to implement the various communication methods, protocols and techniques according to the implementations.

Furthermore, the disclosed procedures may be readily implemented in software using object or object-oriented software development environments that provide portable source code that can be used on a variety of computer or workstation platforms. Alternatively, the disclosed arrangements may be implemented partially or fully in hardware using standard logic circuits or VLSI design. The communication arrangements, procedures and protocols described and illustrated herein may be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed procedures may be readily implemented in software that can be stored on a computer-readable storage medium (such as memory 208), executed on programmed general-purpose computer with the cooperation of a controller (such as controller 206) and memory 208, a special purpose computer, a microprocessor, or the like. In these instances, the arrangements and procedures of the described implementations may be implemented as program embedded on personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system, such as the hardware and software systems of a test/modeling device.

CONCLUSION

Although the implementations of the disclosure have been described in language specific to structural features and/or methodological acts, it is to be understood that the implementations are not necessarily limited to the specific features or acts described. Rather, the specific features and acts are disclosed as representative forms of implementing the invention.

What is claimed is:

1. A method, comprising:
   monitoring a network, by a node, for medium access control (MAC) cycle information at neighboring domains;
   determining, by the node, a MAC cycle for a domain at the node based on a quantity of neighboring domains detected;
   updating a MAC cycle alignment identification (ID) for the domain at the node based on the determining;
   transmitting a MAC cycle communication including the MAC cycle alignment ID;
   updating a value indicating a number of domains that are synchronized to the MAC cycle for the domain at the node; and
   transmitting the MAC cycle communication including the value.

2. The method of claim 1, further comprising selecting a start for the MAC cycle for the domain at the node based on an alternating current (AC) line cycle synchronization rule when no mobile application protocol (MAP) physical layer (PHY) frames from other domains are detected by the node and the MAC cycle for the domain at the node is not aligned to another MAC cycle.

3. The method of claim 1, further comprising aligning the MAC cycle for the domain at the node to an access network.

4. The method of claim 1, further comprising aligning the MAC cycle for the domain at the node to a MAC cycle of a neighboring domain when the neighboring domain is a single other domain detected by the node and no access network is detected.

5. The method of claim 4, further comprising updating the MAC cycle alignment ID to a MAC cycle alignment ID of the neighboring domain, updating a value indicating a number of domains that are synchronized to the MAC cycle for the domain at the node to 2, and transmitting an updated MAC cycle communication including the updated MAC cycle alignment ID and the updated value.

6. The method of claim 1, further comprising, when more than one neighboring domain is detected by the node, aligning the MAC cycle for the domain at the node to a MAC cycle of another domain in a descending priority comprising:
  i) aligning the MAC cycle for the domain at the node to a MAC cycle of a domain that is aligned to an access network; or
  ii) aligning the MAC cycle for the domain at the node to a MAC cycle of a domain that has a larger quantity of other domains aligned to its MAC cycle; or
  iii) aligning the MAC cycle for the domain at the node to a MAC cycle of a domain that has a larger MAC cycle alignment ID and is not aligned to an access network.

7. The method of claim 6, further comprising updating the MAC cycle alignment ID to a MAC cycle alignment ID of the other domain, updating a value indicating a number of domains that are synchronized to the MAC cycle for the domain at the node to one more than the number of domains that were previously synchronized to the MAC cycle for the other domain, and transmitting an updated MAC cycle communication including the updated MAC cycle alignment ID and the updated value.

8. A system, comprising:
  a communication network medium; and
  at least two nodes coupled to the medium, the nodes arranged to communicate at least in part via the medium, the nodes arranged to align medium access control (MAC) cycles at the nodes based on a MAC cycle alignment identification at one or more of the nodes and a quantity of domains that are synchronized to a MAC cycle represented by the MAC cycle alignment identification,
  wherein at least one node is arranged to periodically transmit data via the communication network medium, the data including a MAC cycle alignment identification at the at least one node and a value corresponding to a quantity of domains that are synchronized to the MAC cycle at the at least one node.

9. The system of claim 8, wherein the communication network medium comprises a network of electrical power distribution conductors.

10. The system of claim 8, wherein a network based on the communication network medium comprises a single communication channel and the at least two nodes represent discrete homogeneous networks communicatively coupled to the single communication channel.

11. The system of claim 8, wherein one or more of the at least two nodes comprises an Orthogonal Frequency Division Multiplexing (OFDM) multicarrier apparatus including a transceiver and a controller.

12. The system of claim 8, wherein the at least two nodes are arranged to communicate via multicarrier symbols including tones or sub-channels, the tones or sub-channels having data bits modulated thereon.

13. A method, comprising:
  decoding, at a node, timing information from data detected at a neighbor network, the data comprising a mobile application protocol (MAP) physical layer (PHY) frame;
  identifying a start of a medium access control (MAC) cycle at the neighbor network based on the timing information; and
  determining an alignment for a MAC cycle at the node with respect to the MAC cycle at the neighbor network based at least in part on the timing information and a comparison of a quantity of domains that are synchronized to the MAC cycle at the node and another quantity of domains that are synchronized to the MAC cycle at the neighbor node, a value corresponding to the another quantity being received in a message.

14. The method of claim 13, further comprising comparing a MAC cycle alignment identification at the node with a MAC cycle alignment identification at the neighbor node and determining the alignment for the MAC cycle at the node based at least in part on the comparison.

15. The method of claim 13, further comprising employing a reconciliation mechanism for determining the alignment for the MAC cycle at the node with respect to the MAC cycle at the neighbor network, the reconciliation mechanism based in part on at least one of a MAC cycle start time, a network alignment, and a MAC address value.

16. The method of claim 15, wherein the reconciliation mechanism comprises employing a random MAC cycle start time at a network of the node.

17. The method of claim 15, wherein the reconciliation mechanism comprises giving priority to a network that is synchronized to an access network.

18. The method of claim 15, wherein the reconciliation mechanism comprises giving priority to a network that has a greater number of networks aligned to it.

19. The method of claim 15, wherein the reconciliation mechanism comprises giving priority to a network having a master node with a larger MAC address.

* * * * *